US006733707B1

(12) United States Patent
Serman et al.

(10) Patent No.: US 6,733,707 B1
(45) Date of Patent: May 11, 2004

(54) HIGH PERFORMANCE MICROCELLULAR FOAM AND MANUFACTURING METHOD APPARATUS THEREOF

(75) Inventors: Carl J. Serman, Cranberry Township, PA (US); Kary L Valentine, Mars, PA (US)

(73) Assignee: C. U. E., Inc., Cranberry Township, PA (US)

( * ) Notice: Subject to any disclaimer, the term of this patent is extended or adjusted under 35 U.S.C. 154(b) by 0 days.

(21) Appl. No.: 09/714,424

(22) Filed: Nov. 16, 2000

Related U.S. Application Data

(60) Provisional application No. 60/165,857, filed on Nov. 16, 1999.

(51) Int. Cl.[7] .............................................. B29C 44/02

(52) U.S. Cl. .......................................... 264/51; 264/54

(58) Field of Search ............................... 264/51, 53, 54

(56) References Cited

U.S. PATENT DOCUMENTS

| | | | | |
|---|---|---|---|---|
| 5,246,977 A | * | 9/1993 | Mussini | 521/159 |
| 5,670,601 A | * | 9/1997 | Allen et al. | 528/76 |
| 5,965,778 A | * | 10/1999 | Allen et al. | 568/620 |
| 6,395,798 B1 | * | 5/2002 | Younes | 521/159 |

* cited by examiner

Primary Examiner—Allan R. Kuhns
(74) Attorney, Agent, or Firm—Webb Ziesenheim Logsdon Orkin & Hanson, P.C.

(57) ABSTRACT

The present invention is a high performance microcellular polyurethane foam suitable for numerous applications normally considered outside the realm of conventional solid systems. Also included in the present invention is a method of manufacturing the high performance microcellular polyurethane foam using controlled water addition, foam surfactant addition, a modified catalyst system, the addition of a delayed action tin catalyst and a reduced NCO/OH ratio. The present invention has special application for industrial parts, especially the bowling equipment industry and the cardboard manufacturing industry.

1 Claim, 8 Drawing Sheets

HIGH PERFORMANCE MICROCELLULAR FOAM AND MANUFACTURING METHOD APPARATUS THEREOF

RELATED APPLICATION

This application is based on priority Provisional Application Serial No. 60/165,857, filed Nov. 16, 1999.

BACKGROUND OF THE INVENTION

1. Field of the Invention

The present invention relates to foam formulations and manufacturing methods and, in particular, to high performance microcellular foam, methods of manufacture and applications thereof.

2. Description of the Prior Art

Solid cast polyurethane systems generally result from the reaction of an isocyanate, a short chain glycol (or amine), and a long chain polyol. To achieve optimal properties, the number of reactive isocyanate and hydroxyl (amine) groups for a given formulation should be nearly equal. The type of isocyanate, glycol, and polyol can be altered to achieve desired properties. In addition, the hardness or modulus of the resulting polyurethane product can be adjusted through the ratio of long chain to short chain polyols in the system.

Polyurethane systems can be classified according to when and how the components are brought together. "One-shot" systems are formed from mixing the individual components all at once. Quasi-prepolymer systems are those in which a portion of the long chain polyol component is pre-reacted with the isocyanate to form an isocyanate-terminated prepolymer. To form the final product, this prepolymer (typically with an isocyanate content in the 15–25% range) is then reacted with the short chain glycol and the remainder of the long chain polyol component. Full prepolymer systems are prepared by pre-reacting the entire long chain polyol component with the isocyanate. The resulting prepolymer (with an isocyanate content typically less than 12% NCO) is then reacted (or cured) wit h the short chain polyol or amine to complete the reaction. Due to the high degree of reaction control, full prepolymer-based systems generally exhibit the best overall physical and dynamic properties of any polyurethane elastomer.

Microcellular polyurethane foams suitable for use in industrial applications are not very common. The most common use is in parts known as "jounce bumpers" which act as damping components in automotive strut suspension systems. The chemical system is based on a polyester-based urethane prepolymer such as the one described in the present invention. However, the isocyanate component most often utilized in the jounce bumpers is 1,5-naphthalene diisocyanate (NDI), as contrasted with methylene diphenyl diisocyanate (MDI)-based systems. MDI-based microcellular systems can be used in other applications including shoe soles, acoustical and isolation damping, engine and tool mounts, and seals and suspension systems. Many of these systems, such as those used in the shoe sole applications, utilize "quasi-prepolymer" systems with isocyanate contents in the 15–30% range.

Problems discussed herein relate to deficiencies in solid polyurethane systems for achieving low durometers and proper load profiles. Improvement in foam properties of the current invention over typical microcellular products is achieved through the use of a prepolymer approach versus a quasi-prepolymer approach. The use of microcellular polyurethane foams in mechanical and industrial applications has been plagued with problems. One such problem has to do with the difficulty of achieving low durometer, low modulus solid polyurethane cast elastomers with properties capable of competing with soft (<~70 Shore A) rubbers. The current solution for this problem consists of adding plasticizers to polyurethane formulations to soften solid elastomers to the desired hardness. The problem with this approach is that, while proper plasticization does reduce hardness and modulus effectively, other physical, mechanical, and dynamic properties are negatively affected, particularly cut/tear resistance and overall toughness.

Another typical problem encountered with prior art solid polyurethanes is the inability to achieve the compressive load profiles required for certain roller/wheel conveying systems, such as bowling ball lift wheels/tracks and corrugated zero crush rolls. The current solution for this problem is to obtain proper compressive loads with solid elastomer materials, in which complex design elements are utilized. The problem with this approach is that the design elements lead to stress concentrations and fatigue points in the material, thereby reducing product life. Further, from the processing standpoint, sophisticated designs lead to high tooling and engineering costs, which can lead to inefficient production.

The full prepolymer approach generally imparts improved properties over traditional quasi-prepolymer-based systems. Currently, proper force levels are achieved with solid elastomers through part design. The present invention allows the method of achieving desired load compression profiles using a compressible micro cellular material, thereby allowing a solid cross-section design to improve part performance and reliability. These material and processing modifications result in design simplification, improved part performance and reliability, and improved processing efficiency. Examples will be presented for specific applications, which demonstrate advances in the art.

SUMMARY OF THE INVENTION

High performance microcellular polyurethane foam has been developed which is suitable for demanding applications requiring high toughness and excellent dynamic characteristics. The current invention includes full prepolymer systems with isocyanate contents in the 3–12% range. In addition, the high compressibility/extensibility of the cellular material provides a route for producing a low modulus material with physical properties typically not attainable in solid cast polyurethane systems. Such characteristics make the material suitable for numerous applications normally considered outside the realm of conventional solid systems. The unique property profile also allows part design modifications. The present invention includes a method of manufacturing a microcellular polyurethane foam comprising the steps of prepare a curative component by mixing a polyol, water, a foam surfactant, and a catalyst component comprising a standard solid cast polyurethane catalyst and a delayed-action tin catalyst; and mixing the curative component with an isocyanate- terminated prepolymer.

In addition, the techniques used to process the chemical system are different from standard solid cast polyurethane practice. Using particularly controlled water addition, foam surfactant addition, a modified catalyst system, adding a delayed action tin catalyst, and a reduced NCO/OH ratio, the process described herein creates a new high performance microcellular foam. This foam has special application for industrial parts that require a flexible, tough, highly compressible polyurethane material. For example, the present invention is particularly successful in the bowling equipment and the cardboard manufacturing industries.

DETAILED DESCRIPTION OF THE PREFERRED EMBODIMENTS

The current invention involves modifications to existing full prepolymer systems and their processing to allow preparation of a high performance microcellular foam product. Similar to standard solid systems, one component of the system is an isocyanate-terminated prepolymer with an isocyanate content less than 12%. The curative component consists of one or more short chain glycols. All work to date has involved MDI-ester prepolymers, although it is anticipated that the concept can be reasonably extended to other common prepolymer compositions, including MDI-ester and TDI-based systems.

The method of producing the present invention includes, as a first step, the carefully controlled addition of water to the polyol component. The water reacts with the isocyanate end groups of the prepolymer to produce a carbamic acid intermediate. This intermediate immediately reacts with another isocyanate group to form a urea linkage and carbon dioxide gas. The liberated gas serves as the blowing agent in the system. As water level affects foam stiffness and density, water concentrations between 1% and 5% of the curative component have been utilized. Water concentrations between 1.5%–3% of the curative component is the preferred range. By contrast, in standard solid systems, care is taken to eliminate all sources of moisture due to bubble formation and the effect of resultant voids, affecting both aesthetics and performance.

Another step requires the addition of a foam surfactant to the polyol component. The surfactant stabilizes the bubbles formed in the blowing reaction to produce a finer and more consistent cell size and structure. Surfactant levels as low as 1% of the curative component have been found to be effective.

Also, the method of the present invention utilizes a modified catalyst system. A catalyst system is required which provides proper balance between the gelling and blowing reaction during mixing. The system consists of a standard solid cast polyurethane catalyst (i.e., DABCO 33LV) which, in the microcellular system, is effective in promoting the water reaction. In addition, a delayed action tin catalyst (i.e., Topcat 290) is added to drive the gelling reaction to completion. A ratio of 1.25:1 tin catalyst:solid cast polyurethane catalyst has been found to produce acceptable product. Without the tin catalysis, the integrity of the supporting polyurethane structure is slow to develop. As a result, fine cell structure is not achieved and dimensional stability of the foam is sacrificed.

The concentration of the catalyst in the polyol component can be adjusted to obtain the desired cream, tack-free, and demold times. Variables such as part size, part geometry, machine output, and productivity requirements will influence the catalyst level used. Concentrations of 0.5%–0.6% of the curative component has been used successfully to provide cream times of 10–20 seconds, tack free times of 45–60 seconds, and demold times of 10–20 minutes. These demold times represent a significant decrease over comparable solid cast systems which typically require 30 minutes to one hour to develop the material strength required to demold parts without damage.

Finally, this method requires stoichiometry adjustment. The ratio of isocyanate groups to hydroxyl groups (typically called NCO/OH index) is an important parameter in polyurethane processing. While solid cast systems can be processed throughout a wide range of NCO/OH indices, the best overall elastomer properties are typically obtained at ratios in the 1.02–1.03 range. The slight excess of isocyanate groups at these ratios presumably leads to a slightly cross-linked structure which imparts the properties characteristic of full prepolymer solid cast systems, i.e., low compression set, excellent dynamic properties, and temperature resistance.

It has been found that the microcellular systems described in the current invention cannot be successfully produced within the typical NCO/OH ratios greater than 1.02, which are characterized by slow build-up of foam integrity, resulting in a product with coarse cell structure and poor dimensional stability. Similar results have been seen at NCO/OH ratios at or below 0.95. Based on observations thus far, acceptable cell structure can be obtained at ratios between 0.96 and 1.02. However, for production of optimum microcellular product, NCO/OH index should be controlled most preferably between 0.98 and 1.00.

Processing methods for the microcellular systems are similar to solid cast prepolymer systems in many respects. The components are heated and accurately metered via precision gear pumps into a dynamic mixhead. A prepolymer temperature of 170° F. to 190° F. is generally required to reduce viscosity to the 500–1500 centipoise level, allowing more efficient pumping and mixing with the low viscosity curative. Curative temperatures between room temperature and 150° F. are typical for standard liquid curatives. Solid curatives require temperatures above their melting point. Once mixed, the material is dispensed into properly designed capped molds with appropriate venting to allow displacement of air as the system foams within the cavity.

The following steps represent further unique differences in manufacturing the present invention versus its solid system counterparts.

The removal of dissolved gas from the prepolymer component of a solid cast system is critical for producing high quality void-free parts and is standard practice in solid cast polyurethane processing. Degassing is typically accomplished by either batch or continuous (thin film) methods by subjecting the prepolymer resin to a vacuum of at least 25 mm Hg until the majority of the dissolved gases are removed. It has been found that the use of the standard prepolymer degassing step in the preparation of the microcellular foam of the present invention produces an unacceptable product with coarse, non-uniform cell structure. Thus, unlike solid cast systems, dissolved gases in the system of the present invention need not be removed and, in fact, are critical to the formation of acceptable foam structure. The dissolved gas acts to provide nucleation sites, which stabilize initial bubble formation. In order to control the gas content of the system, it has been found beneficial to maintain the prepolymer under elevated pressures during processing. The higher pressure assists in solubilizing sufficient gas to adequately nucleate the system and prevents the dissolved gas from diffusing out of the material. Application of 60–100 psi of dry nitrogen to the component tank has been found to be satisfactory for this purpose.

The formation of small, well dispersed bubbles during the initial stages of reaction are critical for producing the fine uniform cell structure noted in these systems. While eliminating the standard prepolymer degassing step is the most convenient approach to ensure gas content in the system, introduction of a gas at the mixhead is also a feasible approach. This can be accomplished effectively through the use of a mixer impeller design, which acts to whip air into the mixture. Another approach is the addition of a controlled amount of gas into the mixhead. This can be accomplished, for example, with a flowmeter-pressure regulator-needle valve arrangement capable of maintaining and controlling low gas flow rates.

Because of the nature of the catalyst system used, processing temperatures are also critical to producing the present invention. As mentioned above, component temperatures for microcellular systems lie in the same range as standard solid cast systems. However, the typical mold temperature range utilized for solid cast systems (200–250° F.) is not appropriate. Due primarily to the temperature-dependence of the tin catalyst present in the system, mold temperature must be maintained between 160–200° F. At temperatures outside of this range, unacceptable foam product is produced due to an improper balance in the competing water and urethane reactions. Defects due to improper temperature control include poor cell structure, scorched part surface, and other surface defects.

The microstructure of cellular polyurethane consists of thin polyurethane/urea walls which define domains (called cells) containing air or other gas. Thus, by definition, the density of microcellular compounds is somewhat less than that of the solid elastomer. The property profile of a given microcellular system is largely determined by this density, which must be taken into consideration during the design and production of foam parts. Various molded densities may be obtained from a given microcellular formulation by filling the mold cavity to different degrees. Consequently, tight control over the shot size of each pour is necessary to produce parts with a consistent molded density.

The so-called free rise density is defined as the density of the foam when allowed to blow and rise without constraint. The free rise density is characteristic of a given formulation and can provide a check that the formulation and parameters are within proper ranges. Factors affecting free rise density are water content in the formulation, catalyst level, and mold and component temperatures. Typically, enough material is introduced into the cavity to produce a molded part density, which is 1.5 to 2 times the free rise density. With insufficient material addition, the microcellular material may not completely fill the cavity or it may collapse or shrink after demold. If too much material is added, the pressure build-up in the mold may become excessive and the part may expand after demold making it difficult to hold dimensional tolerances. For the microcellular compounds of the current invention, free rise densities of 16–20 pounds per cubic foot (pcf) and molded part densities in the 25–40 pcf range are typical.

Additional high temperature cure of solid cast elastomer parts after demold is standard practice. This postcure is necessary to complete the curing process and provide a material with optimum properties. Typical postcures of 16 hours or more at temperatures in excess of 230° F. are common. Microcellular parts develop strength very quickly during the reaction. In a very short time period after mixing, near optimum physical properties are achieved. As a result, microcellular parts can be demolded much faster than solid cast parts and any additional postcure cycle can be eliminated.

The microcellular materials described above offer many advantages over solid systems. The microcellular materials provide the ability to achieve low modulus, highly flexible polyurethane material and parts which exhibit excellent physical properties, including high toughness, tear resistance, high compressibility, and puncture resistance. These methods produce excellent dynamic properties, including greater fatigue resistance due to less resistance to deformation. Easier and more efficient processing occurs due to faster demold times, no need for a prepolymer degassing step or postcure cycle, and reduced care needed in material handling to protect components from atmospheric moisture.

| Isocyanate Prepolymer: Baytec MS-242 (6.7% NCO MDI-ester prepolymer) | | |
|---|---|---|
| Curative: | 64% | Triethylene Glycol |
| | 32% | 1,4-Butanediol |
| | 2.5% | Water |
| | 0.30% | Topcat 290 catalyst |
| | 0.24% | DABCO 33LV catalyst |
| | 1.0% | DC-193 Surfactant |

The components, when mixed at an NCO/OH ratio of 1.00, produce a microcellular product with a free rise density of 17–18 pounds per cubic foot (pcf), a cream time of 12–15 seconds, a tack free time of 45–60 seconds, and a demold time of 15 minutes. Parts molded in the 25–30 pcf range have been found to be useful in a number of applications including those described below.

Figure 1:
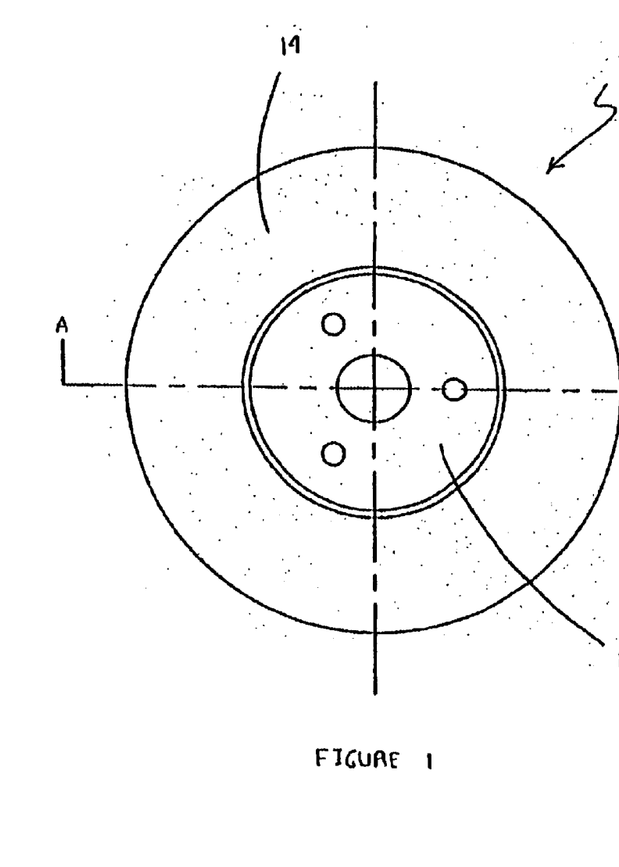
FIG. 1 is a side view of a ball lift wheel using the current invention.
Figure 2:
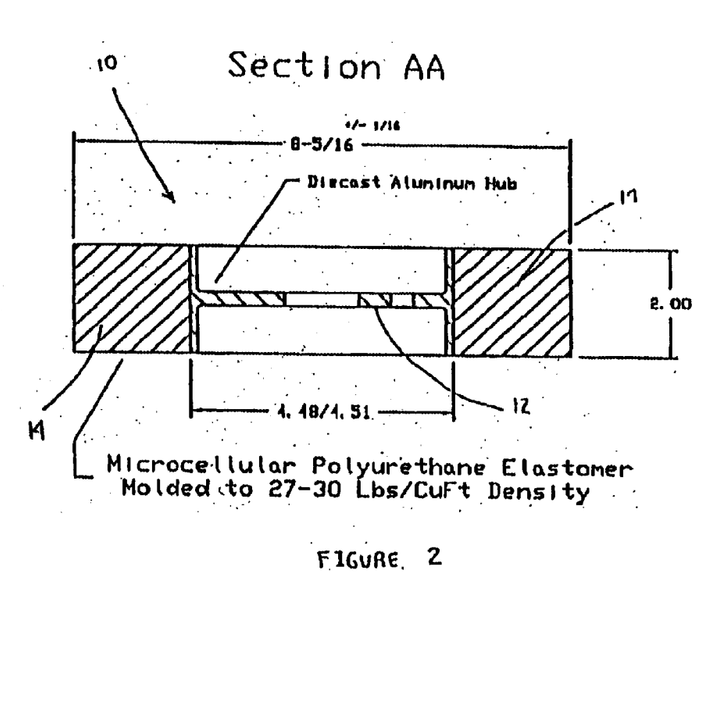
FIG. 2 is a cross-sectional view of a ball lift wheel using the current invention.

A first application utilizing the present invention includes bowling ball lift wheels and lift tracks, which are used as components of OEM bowling equipment and which are designed to change the elevation of bowling balls from below grade to a comfortable height at the ball return station. As seen in FIGS. 1 and 2, the bowling ball lift wheel 10 consists of a circular hub 12 surrounded by a circular molded foam 14 manufactured from the present invention. Overall, the bowling ball lift wheel 10 appears tire-like, with the circular hub 12 acting as the rim and the circular molded foam 14 acting as the tire. There are two bowling ball lift wheels 10 used in a counter rotating sense on each ball lift mechanism. The bowling ball lift wheels 10 are separated a certain distance in a vertical sense and each bowling ball lift wheel 10 is nested inside a set of two concentric arcs of opposite orientation. The lift tracks (not shown) are mounted to two parallel steel "CC" tracks which comprise each concentric arc. The lift tracks provide the proper fit to effectively convey the ball through the mechanism as well as to provide a soft, durable transport surface which will not mark or mar the ball.

Once ejected from the back of the alley, the bowling ball returns via a track to the ball lift mechanism. At this point, the ball is trapped by way of interference between the lower bowling ball lift wheel 10 and the lift tracks. The lower bowling ball lift wheel 10 (rotating in a counter-clockwise direction as viewed from the left) deforms against the ball surface, generating force in order to lift the bowling ball through the arc until it is contacted by the upper bowling ball lift wheel 10. At this point, the ball is transferred to the upper lift tracks and upper bowling ball lift wheel 10 (rotating clockwise as viewed from the left), the direction of the ball is changed and the ball rolls along the upper arcs until interference is lost and the ball is released at the new elevation.

Figures 11, 12:
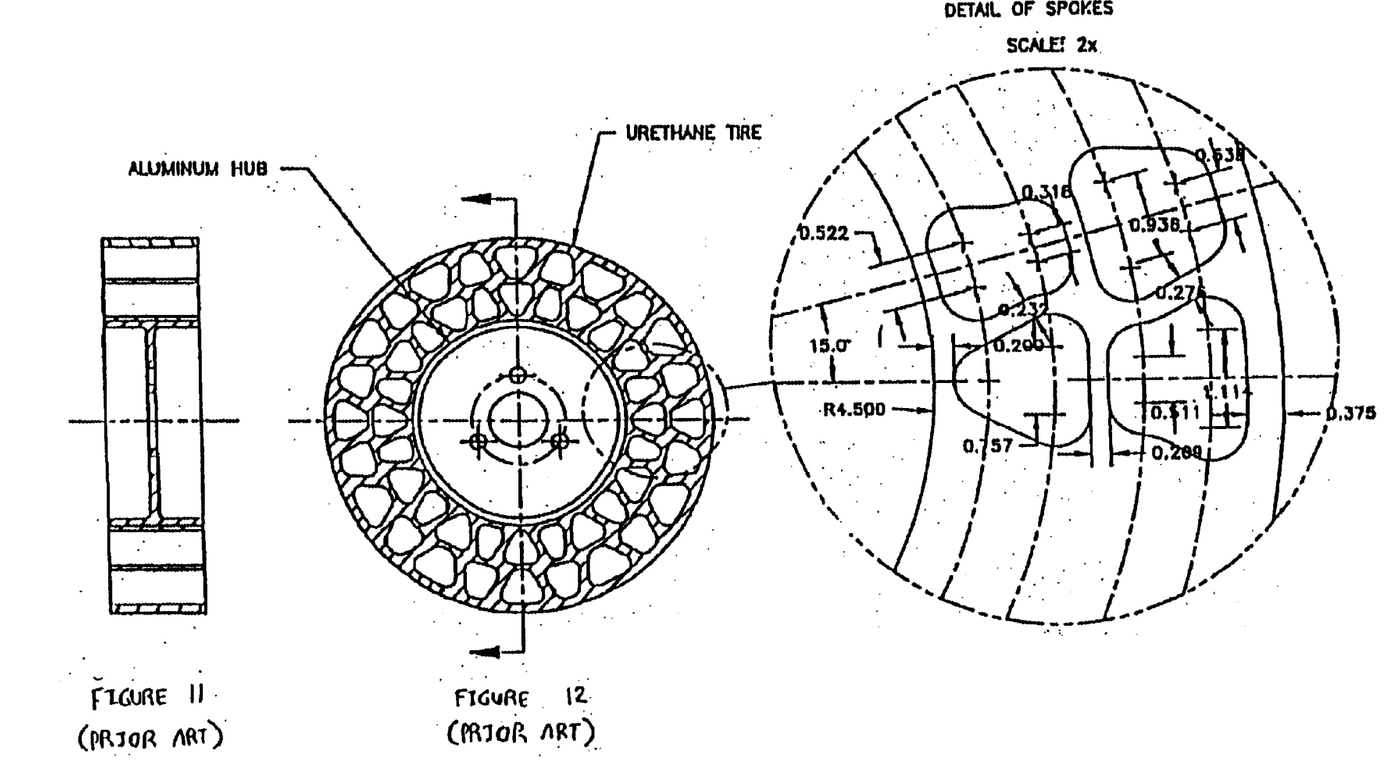
FIG. 11 is a cross-sectional view of the prior art bowling ball lift wheel.
FIG. 12 is a side view of the prior art bowling ball lift wheel.
Figure 13:
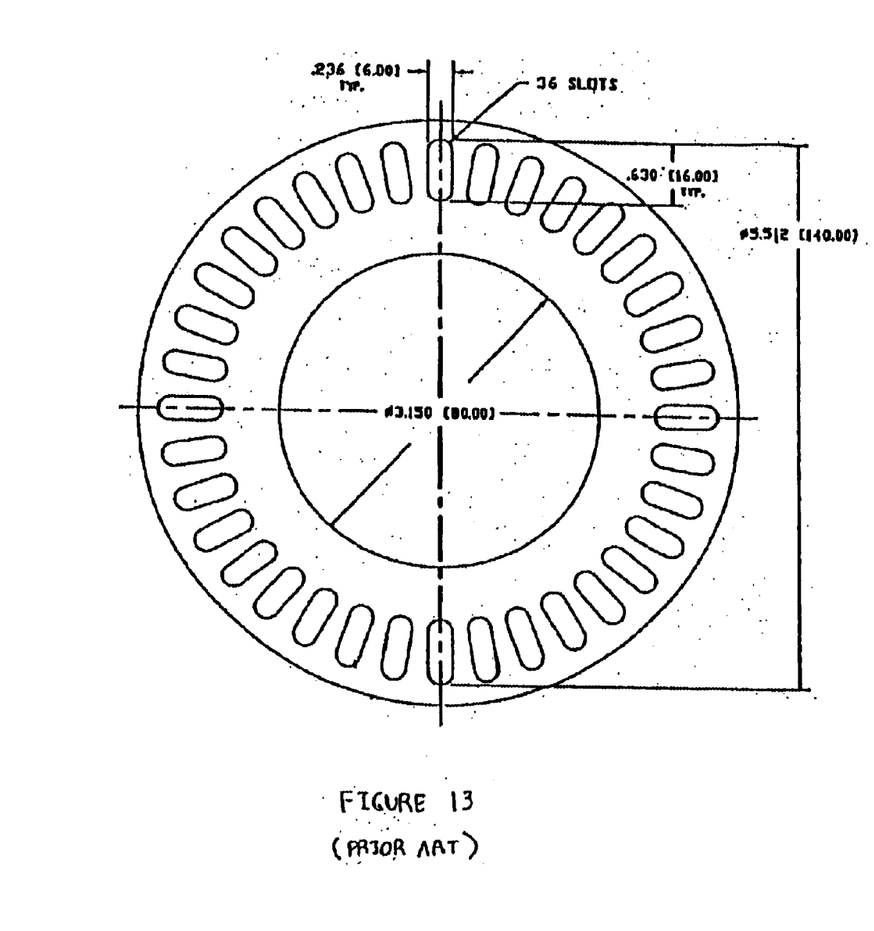
FIG. 13 is a side view of the prior art zero crush roll.
Figure 14:
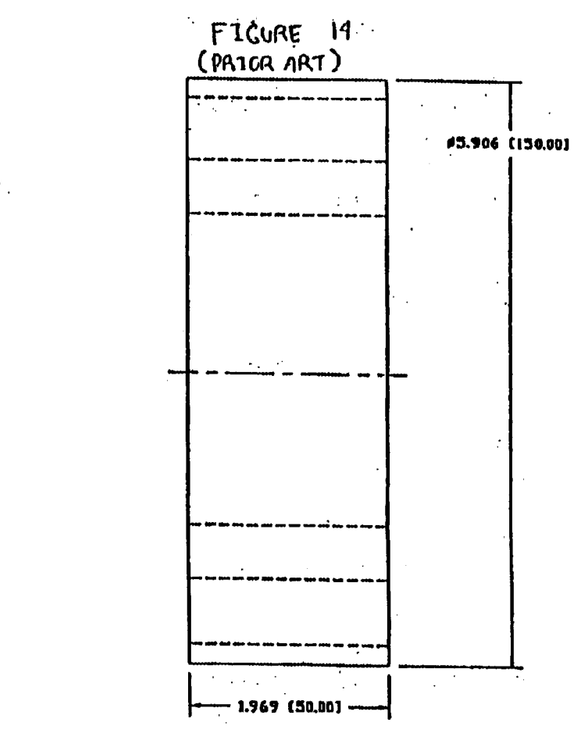
FIG. 14 is a top view of the prior art zero crush roll.
Figure 15:
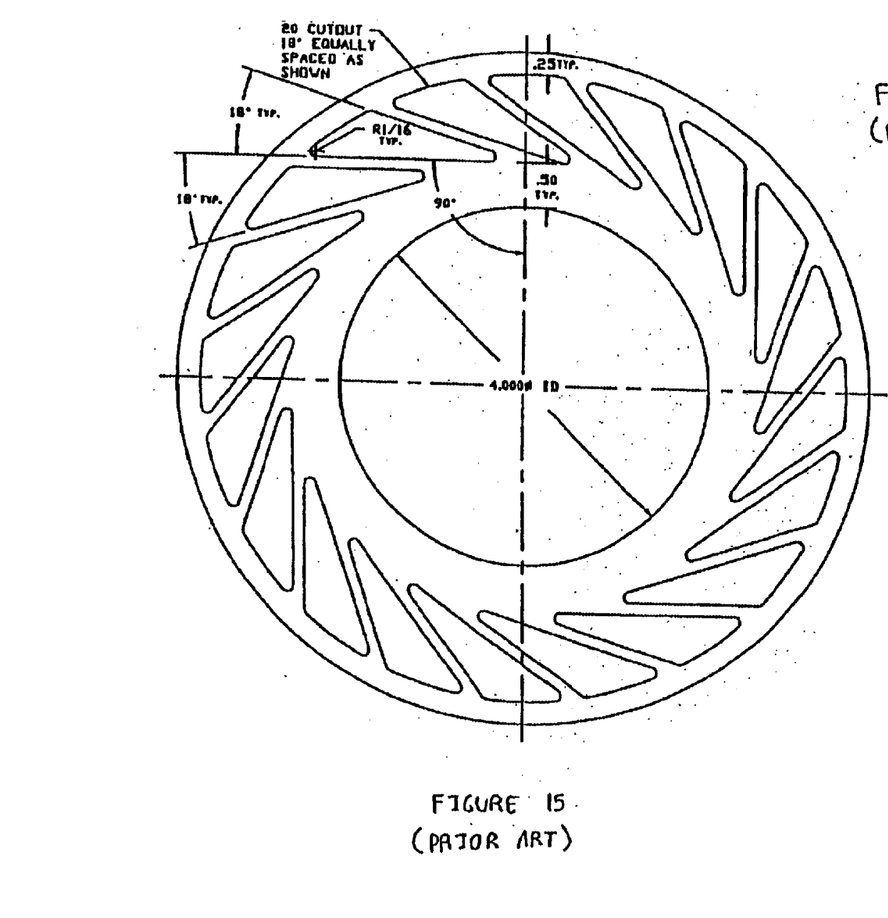
FIG. 15 is a side view of a further prior art zero crush roll.
Figure 16:
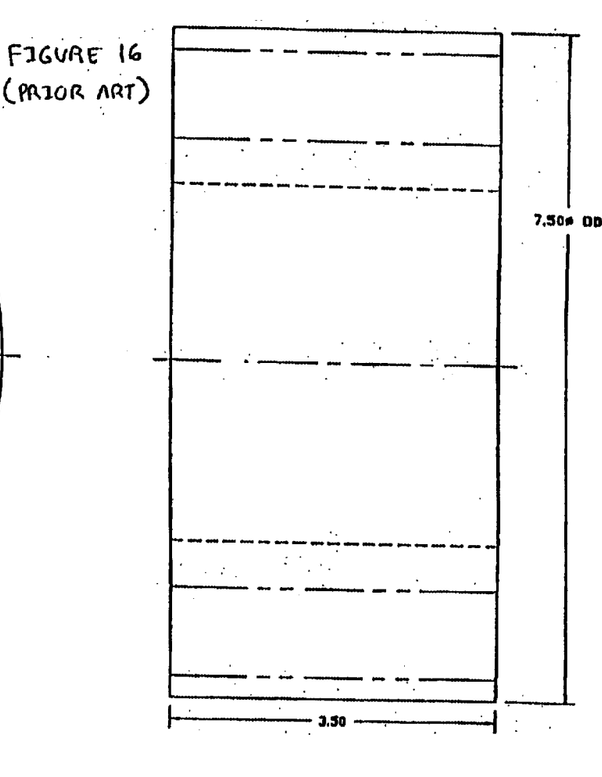
FIG. 16 is a top view of a further prior art zero crush roll.

The advantages of using the present invention in this application are numerous. The soft pliable surface of the present invention is much softer than any current lift wheel designs. This results in a component that will not damage the surface of bowling balls and is completely non-marking. The solid cross-section of the bowling ball lift wheel 10 of the present invention is much less susceptible to failure when compared to the webbed design of the prior art waffle-style wheel (shown in FIGS. 11 and 12) and thinner cross-section of the V-style wheels. Further, the solid cross-section transfers much less force to the interface of the bonded metal and foam, reducing failures associated with delamination of the circular molded foam 14 and the circular hub 12. The simple design allows for solid cross-section parts using less material than current designs, and the pliable full cross-section design allows for continual wear without failure. Damping nature of the present invention allows for smoother, quieter operation. The present invention is manufactured from simple inexpensive tooling compared to current designs, and, additionally, is manufactured much more efficiently than cast elastomer designs.

A second application of the present invention involves zero crush rolls 16, which are used in the manufacturing process for producing corrugated board-stock. During the manufacturing process, rolls of paper stock are fed into a corrugator machine. The corrugator applies a liquid starch and glue to the surfaces of the paper stock. Once the starch and glue is applied, the paper is fed through a series of rollers that form the paper to a corrugated configuration. After the paper stock is corrugated, additional sheets of paper are laminated to both sides. The end result is a corrugated board made-up of various layers of paper stock. The process of manufacturing the corrugated board-stock is a continuous process that requires a conveyor system to handle the fresh board so as not to crush the corrugated portion of the board.

Figure 3:
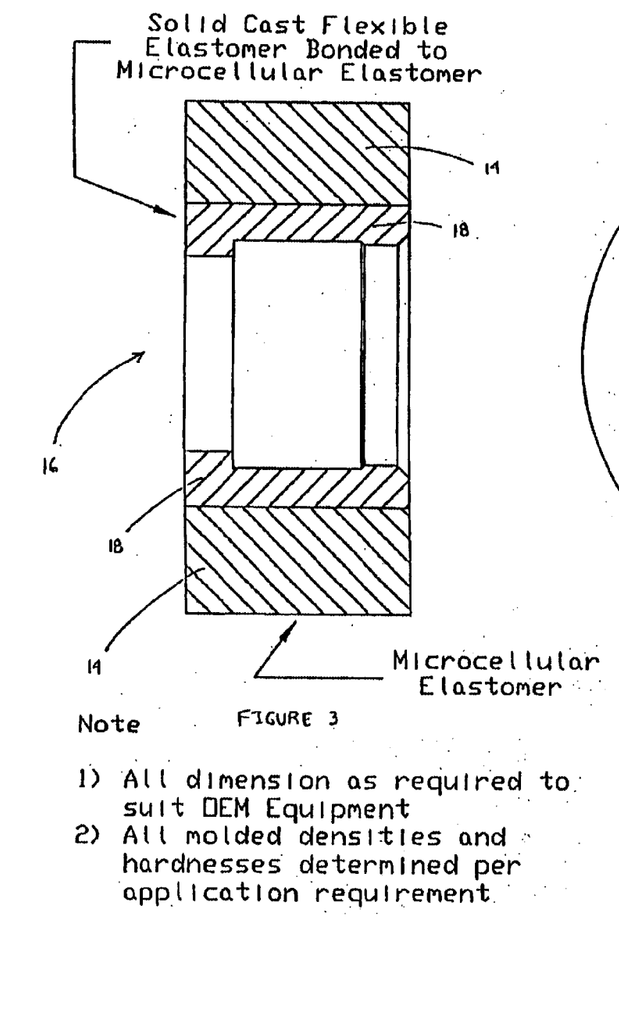
FIG. 3 is a cross-sectional view of the first embodiment of a zero crush roller using the current invention.
Figure 4:
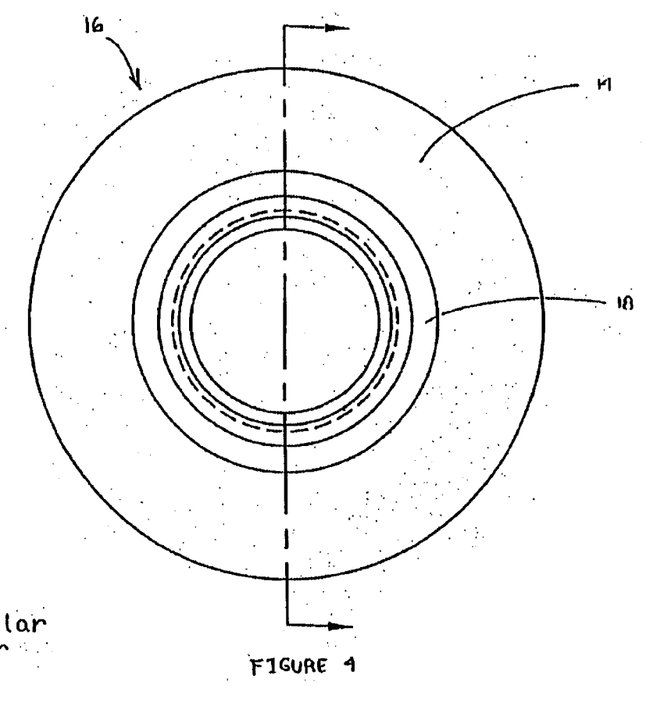
FIG. 4 is a side view of the first embodiment of a zero crush roller using the current invention.

The conveyor system is made-up of a series of parallel steel shaft rollers mounted with bearings to a steel frame. As seen in FIGS. 3 and 4, the zero crush rolls 16 of the first embodiment consist of a circular molded solid cast elastomer 18 and a circular molded foam 14 of the present invention bound to the circular molded solid cast elastomer 18. The zero crush rolls 16 are either pressed onto or mounted to the steel rollers with the circular molded solid cast elastomer 18 capturing a bearing. The zero crush rolls 16 are designed to deflect easily under the weight of the board-stock being conveyed. The deflection of the zero crush rolls 16 preserves the integrity of the corrugated configuration as it is being conveyed in the wet state.

Prior art zero crush rolls, as seen in FIGS. 13–16 are designed with two concentric rings that are joined together by a series of angular positioned ribs or ovular cut-outs. The preferred material is polyurethane that allows the roller to be cast as a homogeneous part. The thickness of these angular ribs or ovular cut-outs, along with the spacing, determines the deflection modulus of the prior art zero crash rolls. As the board-stock is conveyed the ribs or cut-outs on the zero crush rolls are constantly flexing. This constant flexing causes the ribs and cut-outs to fatigue resulting in the failure of the zero crush rolls.

The zero crush rolls 16 of the present invention do not require ribs by design, eliminating the major cause of failure in the current zero crush wheels. By engineering the ribs out of the wheels, the end user can expect longer life from them. This extra life reduces machine downtime due to fewer changeovers, therefore improving machine productivity. Due to the design simplification, the tooling cost to produce the zero crush rolls 16 is reduced significantly. This design simplification allows higher quality zero crush rolls 16 to be produced without incurring extra expense. This equates to a cost saving for the end user. The same tooling can be used to produce a variety of zero crush rolls 16 that have different deflection modulus properties. This is accomplished by changing the density of the present invention.

Figure 5:
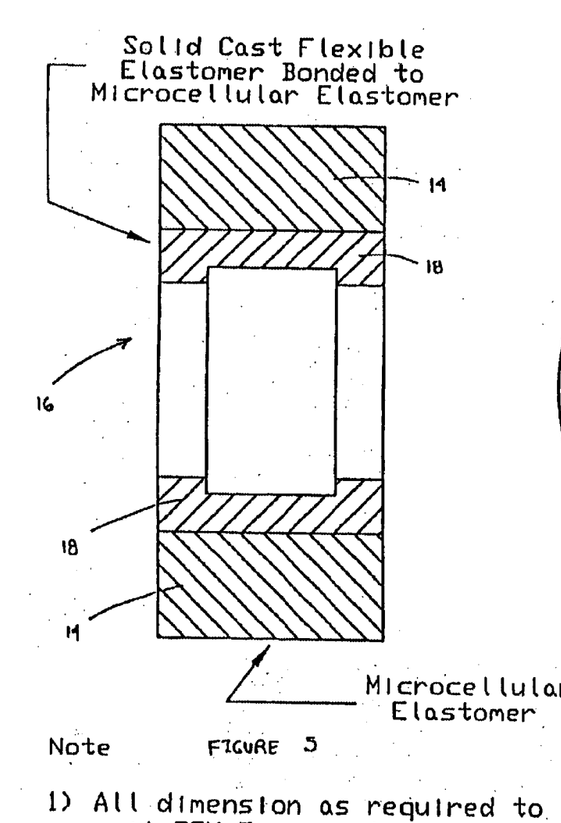
FIG. 5 is a cross-sectional view of the second embodiment of a zero crush roller using the current invention.
Figure 6:
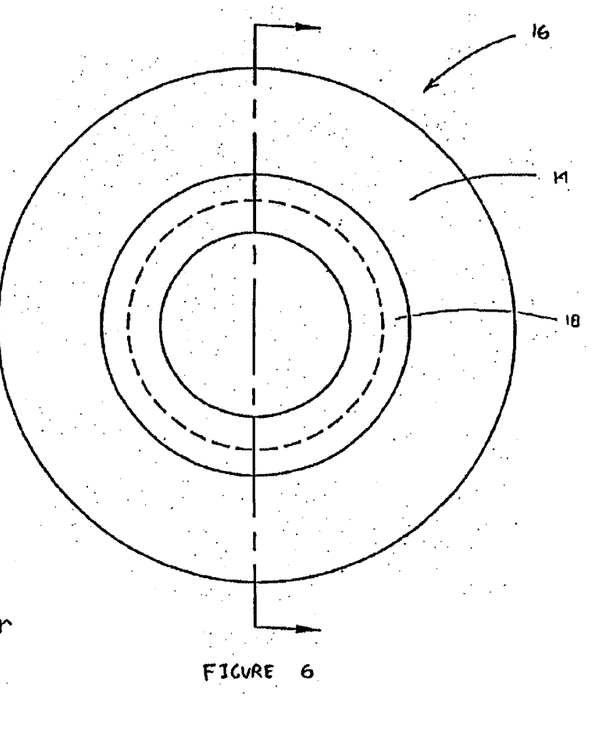
FIG. 6 is a side view of the second embodiment of a zero crush roller using the current invention.
Figures 7, 8:
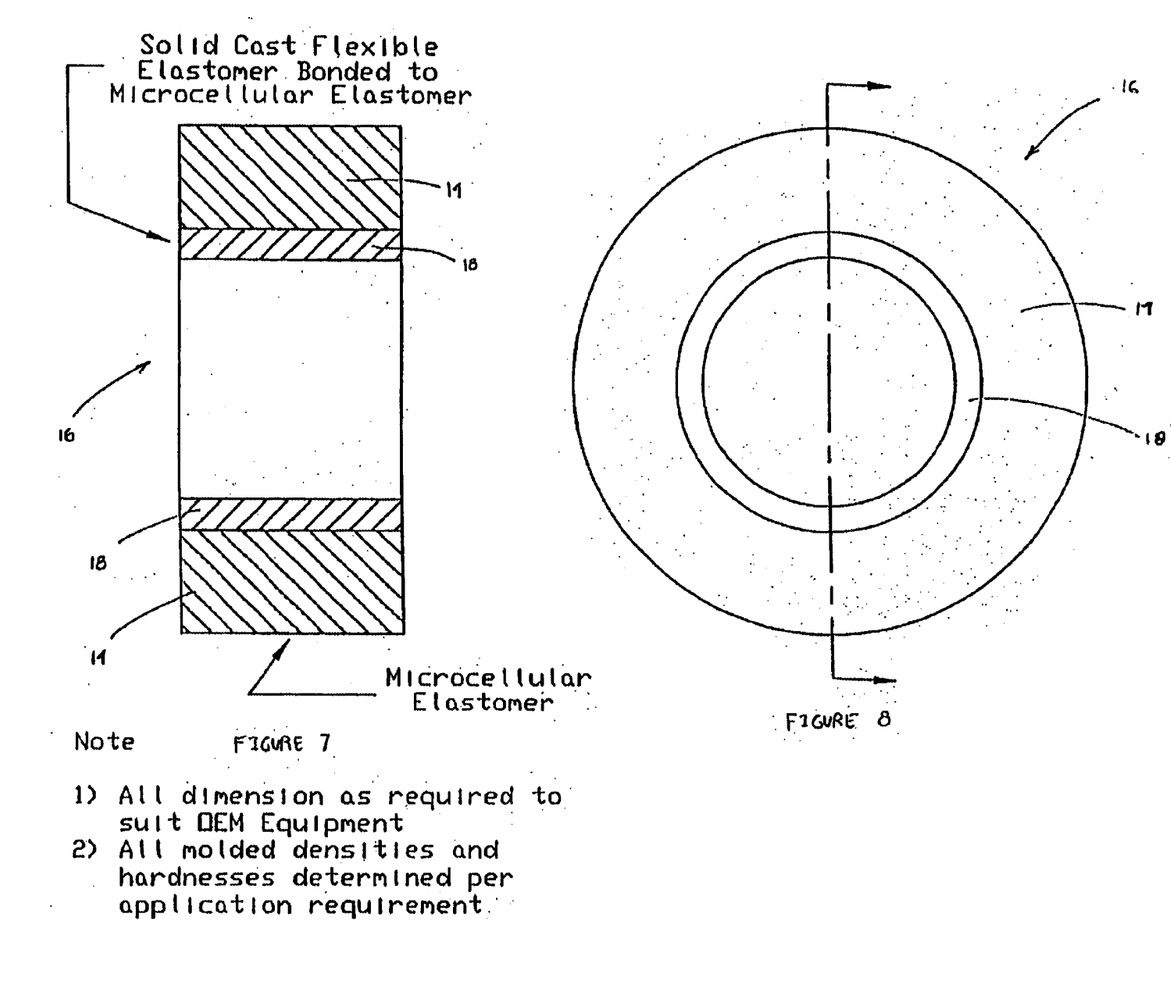
FIG. 7 is a cross-sectional view of the third embodiment of a zero crush roller using the current invention.
FIG. 8 is a side view of the third embodiment of a zero crush roller using the current invention.
Figure 9:
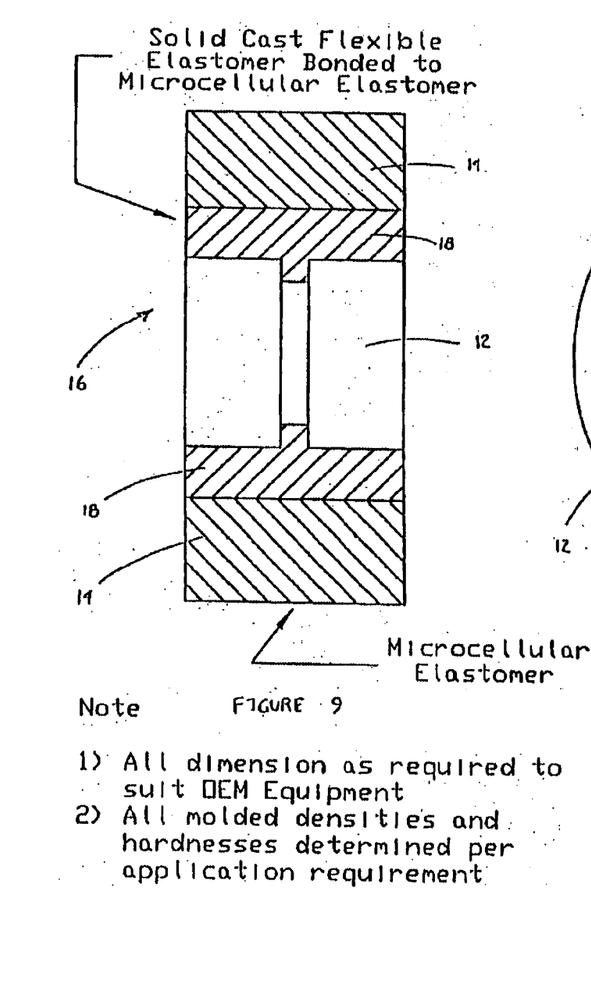
FIG. 9 is a cross-sectional view of the fourth embodiment of a zero crush roller-using the current invention.
Figure 10:
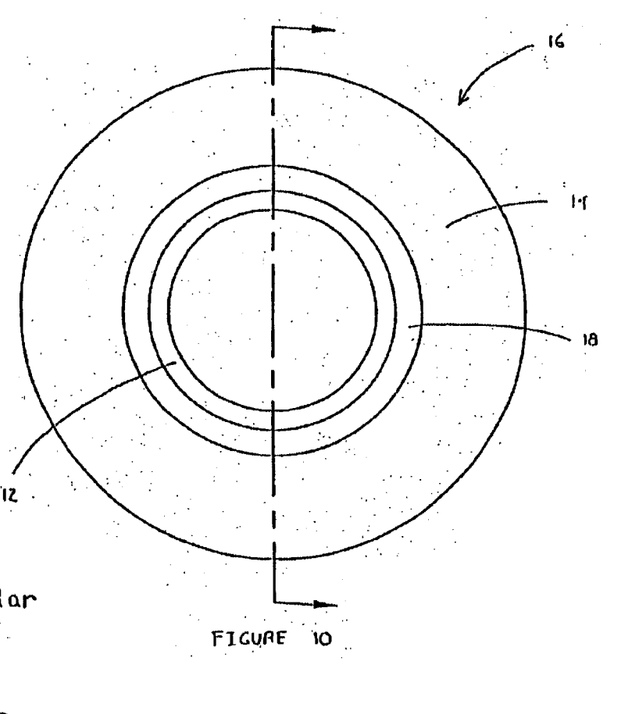
FIG. 10 is a side view of the fourth embodiment of a zero crush roller using the current invention.

The second embodiment of the zero crush rolls application is shown in FIGS. 5 and 6. This embodiment varies the shape of the circular molded solid cast elastomer 18, but, as to the present invention, utilizes the same circular molded foam 14. Similarly, the third embodiment of the zero crush rolls application, as seen in FIGS. 7 and 8, differs from the first and second embodiments only with respect to the shape of the circular molded solid cast elastomer 18. In the third embodiment, again the circular molded foam 14 of the present invention is bound to the circular molded solid cast elastomer 18. Finally, FIGS. 9 and 10 show a fourth embodiment of the zero crush rolls application. Again, this embodiment uses the circular molded foam 14 of the present invention bound to a circular molded solid cast elastomer 18 of a differing cross-section than the previous embodiments.

The present invention is also applicable to other applications in addition to those mentioned above. In the bowling industry, the present invention can be utilized in the manufacture of ball lift wheels, ball lift tracks, pit cushions, deck pads and ball polishing tools. In the corrugated industry, the foam of the present invention may be used in manufacturing zero crush wheels, lead edge feed wheels, pull rolls, taper rolls, and die ejection material. The present invention is also applicable in the creation of sporting goods, such as archery targets, bicycle seat cushions, protective pads and helmets. Various other applications are also anticipated, for example, medical body support pads, outrigger pads, impact absorbing sheets, custom packaging, anti-vibration spacers and mounts, springs, protective coverings, sound dampening material, seals, and insulation.

Although the specific description of the herein disclosed invention has been described in detail above, it may be appreciated that those skilled in the art may make other modifications and changes in the invention disclosed above without departing from the spirit and scope thereof.

We claim:

1. A method of manufacturing a microcellular polyurethane foam comprising the steps of:

selecting an isocyanate-terminated prepolymer containing less than 12% functionality;

preparing a curative component by mixing a polyol, water, a foam surfactant, and a catalyst component comprising a standard solid cast polyurethane catalyst and a delayed-action tin catalyst, wherein the ratio of tin catalyst to standard solid cast polyurethane catalyst component is about 1.25:1 and said water comprises between 1% and 5% of weight of said curative component; and mixing said curative component with said isocyanate-terminated prepolymer at a functional group (NCO/OH) ratio of about 1:1, provided that if said isocyanate-terminated prepolymer or said curative component is present in excess of one over the other, the maximum percentage of said excess over the other is 2%.

* * * * *